United States Patent
Costa

(10) Patent No.: US 10,202,260 B2
(45) Date of Patent: Feb. 12, 2019

(54) RIGGING CONNECTOR HAVING COMBINATION HOOK AND SHACKLE MOUNTING

(71) Applicant: Factor 55, LLC, Boise, ID (US)

(72) Inventor: Michael Douglas Costa, Boise, ID (US)

(73) Assignee: Factor 55, LLC, Boise, ID (US)

( * ) Notice: Subject to any disclaimer, the term of this patent is extended or adjusted under 35 U.S.C. 154(b) by 0 days.

(21) Appl. No.: 15/339,672

(22) Filed: Oct. 31, 2016

(65) Prior Publication Data

US 2017/0121154 A1    May 4, 2017

Related U.S. Application Data

(60) Provisional application No. 62/247,992, filed on Oct. 29, 2015.

(51) Int. Cl.

| *B66C 1/10* | (2006.01) |
| *B66C 1/36* | (2006.01) |
| *F16G 15/06* | (2006.01) |
| *F16B 45/02* | (2006.01) |
| *B66C 15/00* | (2006.01) |

(52) U.S. Cl.
CPC ............... *B66C 1/10* (2013.01); *B66C 1/36* (2013.01); *B66C 15/00* (2013.01); *F16B 45/02* (2013.01); *F16G 15/06* (2013.01)

(58) Field of Classification Search
CPC .. B66C 1/10; B66C 1/36; B66C 15/00; B66D 1/00; F16G 11/02; F16G 11/146; F16G 15/06; F16G 15/08; F16B 45/02
USPC .................................................. 294/82.17
See application file for complete search history.

(56) References Cited

U.S. PATENT DOCUMENTS

| 1,222,997 A | 4/1917 | Rottmer |
| 1,392,138 A | 9/1921 | Freeman et al. |
| 2,275,162 A | 3/1942 | Sutthoff |
| 2,687,899 A | 8/1954 | Bendtsen |
| 2,835,528 A | 5/1958 | McCarthy et al. |
| 2,904,906 A | 9/1959 | Smith |

(Continued)

FOREIGN PATENT DOCUMENTS

| GB | 1486067 A | 9/1977 |
| JP | 8-217362 A | 8/1996 |
| WO | 03055784 A1 | 7/2003 |

OTHER PUBLICATIONS

European Patent Office, "International Search Report and Written Opinion dated Feb. 6, 2017", PCT/US2016/059764, 10 Pages.

*Primary Examiner* — Stephen A Vu
(74) *Attorney, Agent, or Firm* — Dorsey & Whitney LLP

(57) ABSTRACT

A rigging connector having combination hook and shackle mounting is provided. The rigging connector may include an elongate body having a central bridge portion and opposing first and second end portions extending from the central bridge portion, a securement member formed in the first end portion of the body and defining a throat opening with the central bridge portion, first and second anchor legs formed in the second end portion of the body, the first and second anchor legs defining a gap therebetween for receiving a portion of a support line, a shear pin operable to retain the support line at least partially within the gap, and a shackle mounting hole defined in the first end portion and having a center axis extending transverse to the shear pin.

22 Claims, 7 Drawing Sheets

(56) References Cited

U.S. PATENT DOCUMENTS

| | | | |
|---|---|---|---|
| 3,269,109 A | 8/1966 | Hart | |
| 3,501,817 A * | 3/1970 | Bambenek | B66C 1/36 24/599.2 |
| 3,757,901 A | 9/1973 | Hobbs | |
| 4,005,904 A | 2/1977 | Weman et al. | |
| 4,193,627 A * | 3/1980 | Cranston | B66C 1/36 294/82.1 |
| 4,225,172 A | 9/1980 | Marquardt | |
| 5,058,243 A | 10/1991 | Rasmussen | |
| 5,765,891 A * | 6/1998 | Fredriksson | B66C 1/125 24/116 R |
| 6,158,760 A | 12/2000 | Kiss | |
| 6,282,879 B1 | 9/2001 | Bonaiti et al. | |
| 6,312,004 B1 | 11/2001 | Kiss | |
| 6,536,794 B2 | 3/2003 | Hancock et al. | |
| 6,948,734 B2 | 9/2005 | Popham | |
| 7,393,033 B1 | 7/2008 | Bisso, IV | |
| 7,631,579 B2 * | 12/2009 | Johnson | H01K 3/32 81/53.1 |
| 7,654,594 B2 | 2/2010 | Bisso, IV | |
| D615,006 S | 5/2010 | Goodman et al. | |
| D615,844 S | 5/2010 | Wiora | |
| 7,871,097 B2 | 1/2011 | Sparkes et al. | |
| 8,328,223 B2 | 12/2012 | Leinenger | |
| 9,039,055 B1 * | 5/2015 | Robins | F16B 45/02 294/82.17 |
| 9,388,025 B2 | 7/2016 | Costa | |
| 2004/0227324 A1 | 11/2004 | Popham | |
| 2005/0279977 A1 | 12/2005 | Kerry | |
| 2006/0087101 A1 | 4/2006 | Yon | |
| 2006/0103111 A1 | 5/2006 | Popham | |
| 2009/0008953 A1 | 1/2009 | Bisso, IV | |
| 2010/0011678 A1 | 1/2010 | Kelly | |
| 2010/0281656 A1 | 11/2010 | Naquin et al. | |
| 2013/0322981 A1 | 12/2013 | Root | |

\* cited by examiner

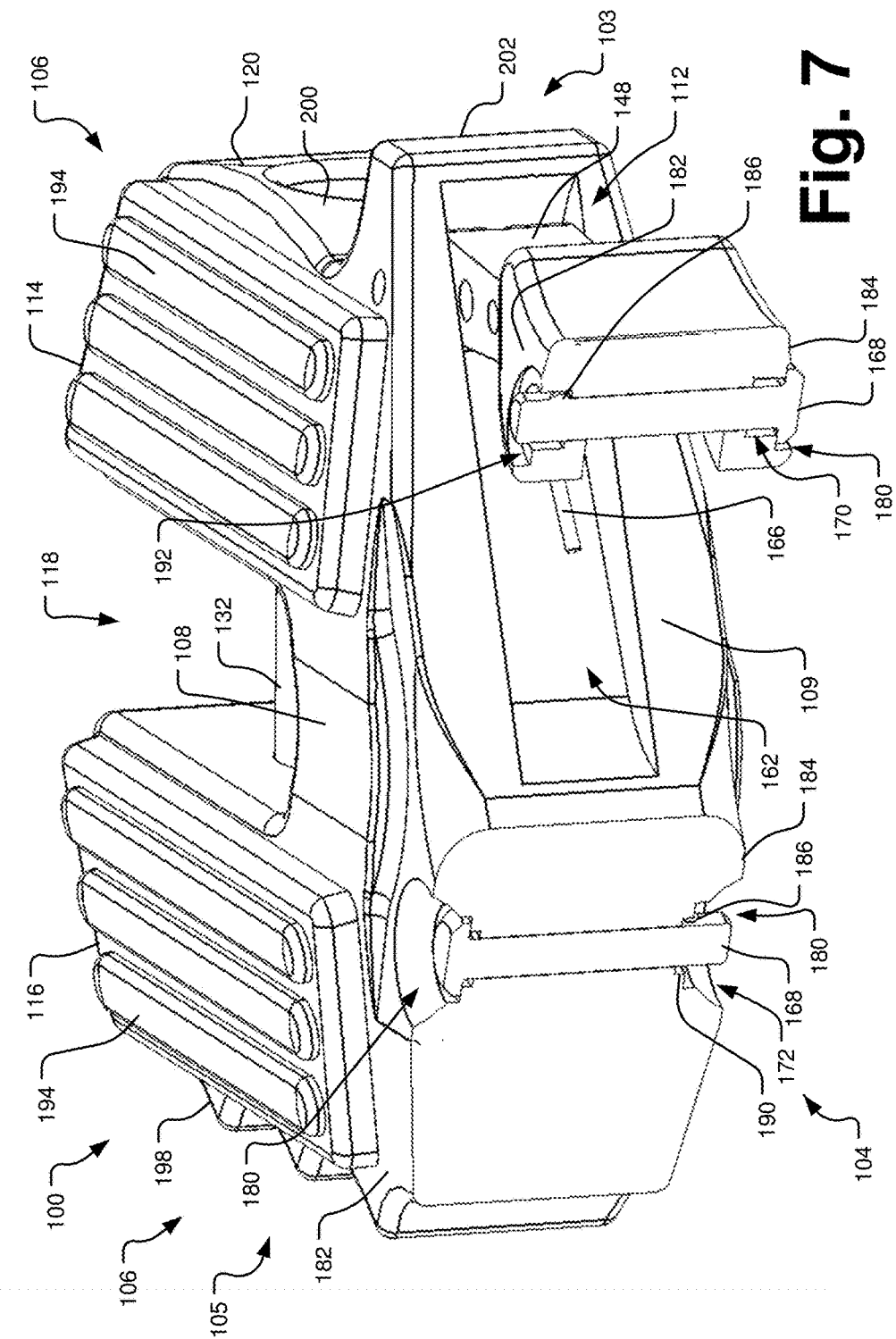

RIGGING CONNECTOR HAVING COMBINATION HOOK AND SHACKLE MOUNTING

CROSS REFERENCE TO RELATED APPLICATIONS

This application claims benefit of priority pursuant to 35 U.S.C. § 119(e) of U.S. provisional patent application No. 62/247,992 filed 29 Oct. 2015 entitled "Rigging connector having combination hook and shackle mounting," which is incorporated herein by reference in its entirety.

TECHNICAL FIELD

This disclosure relates generally to rigging and, more specifically, to rigging connectors having combination hook and shackle mounting.

BACKGROUND

Hooks for rigging, lifting, recovery, and the like are typically adapted for use under constant tension applications. It is common to see lifting hooks and shackles on overhead cranes and recovery winches and in other lifting and recovery applications where constant tension is applied to a load. Whenever a hook is being used in an application where there may be momentary slack in the load, there is a chance that the load (e.g., cable, rope, strap, clevis) attached to the hook may shift or escape through an opening in the hook. To address this issue, it is common to see safety latches, locking hooks, etc. implemented to address this load escape possibility. These current safety devices are not designed to accept loads and/or forces that may shift into or adjacent the latch or locking mechanism. Further, it does not require much force to overcome a common safety spring latch mechanism or to begin to crack open a locking hook. Thus, current safety devices do not fully prevent loads from escaping.

One application for hooks is in connection with off road vehicles that are equipped with electric or hydraulic recovery winches. These winches allow the vehicle owner to extract the vehicle out of a ditch or other hazard in which the vehicle may be stuck. Typically, a winch has a recovery line that terminates in a loop end, which accepts a common recovery hook providing a connection point for a towing strap. A typical recovery winch may be equipped with the hook already attached to the loop end. The hook is typically connected to the loop end by a shear pin and cotter pin. These hooks, however, may allow the towing strap or chain to disengage from the hook through the hook's opening. Although some hooks are equipped with a safety latch that prevents the mating rope or strap from coming loose from the hook, these latches are weak and are not designed to accept high loads.

The present disclosure addresses these and other limitations of the prior art. Specifically, the present disclosure identifies ways in which use of a shackle combined with a hook can provide advantages for off-road vehicles or other applications.

The information included in this Background section, including any description or discussion thereof, is included for technical reference purposes only and is not to be regarded subject matter by which the scope of the invention as defined in the claims is to be bound.

BRIEF SUMMARY

The present disclosure generally provides a rigging connector having a combination hook and shackle mounting. In one embodiment, the rigging connector may include an elongate body having a central bridge portion and opposing first and second end portions extending from the central bridge portion, a securement member formed in the first end portion of the body and defining a throat opening with the central bridge portion, first and second anchor legs formed in the second end portion of the body, the first and second anchor legs defining a gap therebetween for receiving a portion of a support line, a shear pin operable to retain the support line at least partially within the gap, and a shackle mounting hole defined in the first end portion and having a center axis extending transverse to the shear pin.

Embodiments of the present disclosure may include a rigging connector. In one embodiment, the rigging connector may include a body having opposing top and bottom surfaces, opposing first and second sides, and opposing first and second end portions; a hook defined in the first end portion, the hook having a substantially cylindrical interior defined by a shank curving from the second side towards the first side, the shank terminating in a tip that defines a slanted opening in the first side of the body; first and second anchor legs formed in the second end portion and defining a gap therebetween; a shear pin having a first end and a second end opposite the first end, the first and second ends received respectively within the second anchor leg and the first anchor leg such that the shear pin spans the gap between the first and second anchor legs; and a shackle mounting hole defined in the hook. Center axes of the interior of the hook and the shackle mounting hole may be orthogonal to a plane bisecting the body between the top and bottom surfaces. The shear pin may extend substantially parallel to the plane and between the first side and the second side.

Embodiments of the present disclosure may include a rigging connector. The rigging connector may include a body having opposing first and second end portions extending from a central bridge portion, a hook defined in the first end portion, and at least one fairlead engagement pad connected to the second end portion. The hook may have a shank extending in an arc to form a saddle portion at the first end portion to define an interior of the hook. The hook may extend from the saddle portion in the direction of the second end portion to terminate at a distal tip that defines a throat opening between the tip and the central bridge portion.

Additional embodiments and features are set forth in part in the description that follows and will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure. One of skill in the art will understand that each of the various aspects and features of the disclosure may advantageously be used separately in some instances, or in combination with other aspects and features of the disclosure in other instances.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

BRIEF DESCRIPTION OF THE DRAWINGS

The accompanying drawings, which are incorporated into and constitute a part of the specification, illustrate examples of the disclosure and, together with the general description above and the detailed description below, serve to explain the principles of these examples.

FIG. 7 is a cross-sectional view of the rigging connector of FIG. 1 taken along line 7-7 of FIG. 3 in accordance with an embodiment of the present disclosure.

DETAILED DESCRIPTION

The present disclosure generally describes a rigging connector that provides improvements or an alternative to existing arrangements. The rigging connector can be used in a variety of applications including, for example, in overhead crane and recovery winch applications. As detailed below, the rigging connector integrates a hook and a shackle mounting to provide multiple attachment options to rigging, lashing, or the like.

Figure 1:
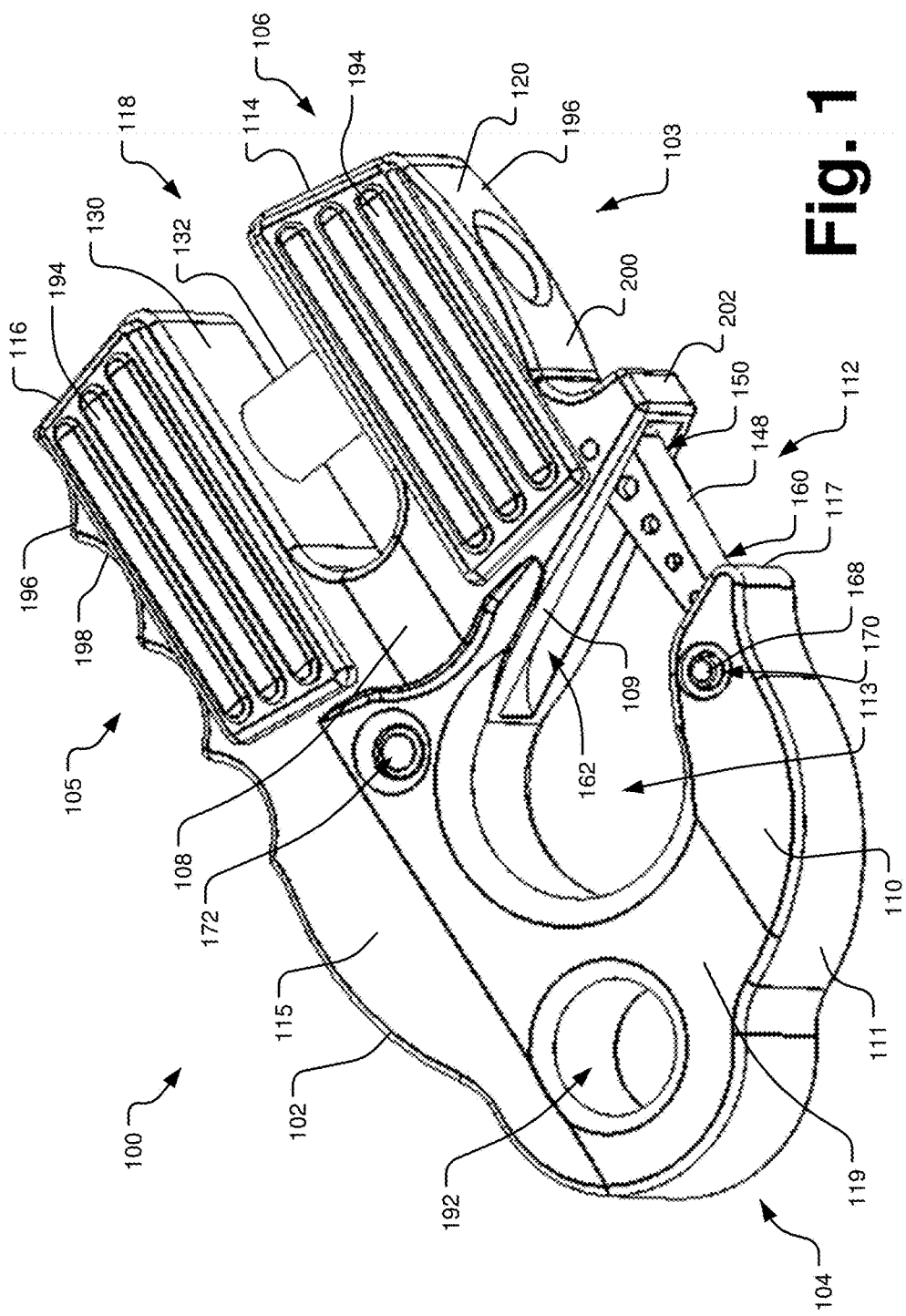
FIG. 1 is a top isometric view of a rigging connector incorporating a combination hook and shackle mounting in accordance with an embodiment of the present disclosure.
Figure 2:
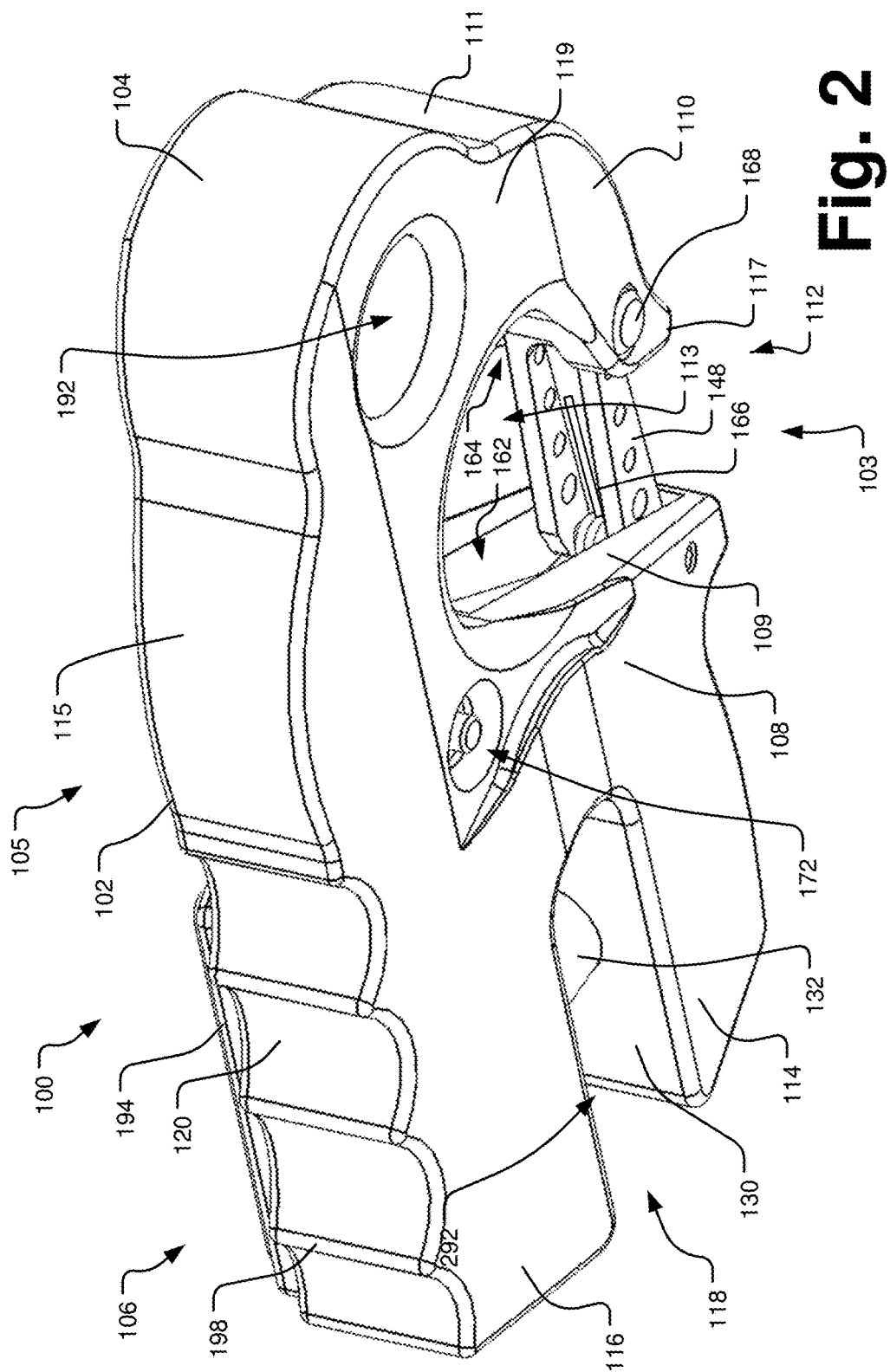
FIG. 2 is a bottom isometric view of the rigging connector of FIG. 1 in accordance with an embodiment of the present disclosure.
Figure 3:
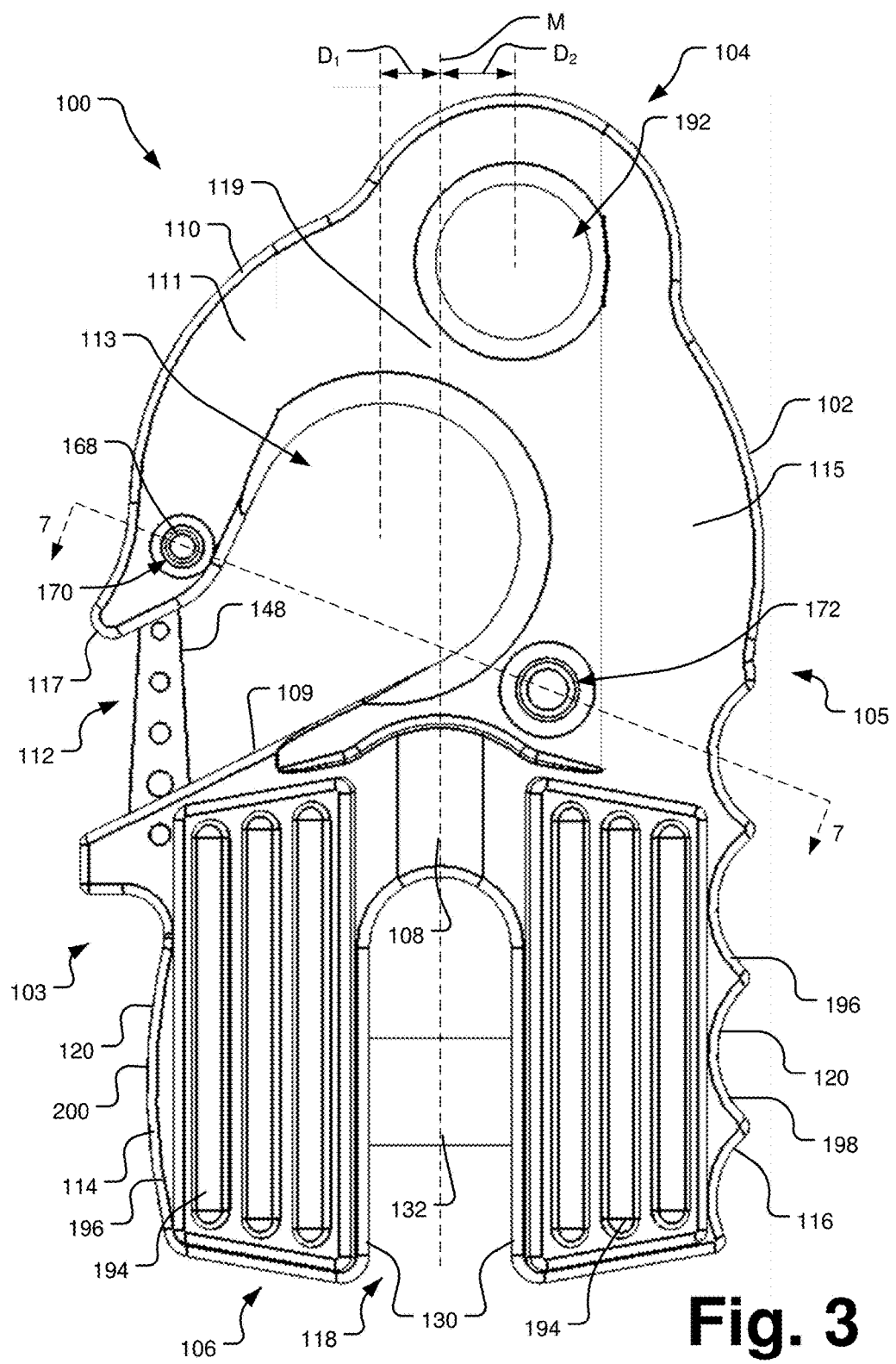
FIG. 3 is a top plan view of the rigging connector of FIG. 1 in accordance with an embodiment of the present disclosure.

Referring now to FIGS. 1-3, a rigging connector 100 generally includes an elongate body 102 having opposing first and second sides 103, 105 and opposing first and second end portions 104, 106 extending from a central bridge portion 108. In some embodiments, the first and second end portions 104, 106 and the central bridge portion 108 may be formed together monolithically, e.g., cast or milled as a single monolithic piece. As shown, the first and second end portions 104, 106 extend away from each other and form attachment structures for attaching the rigging connector 100 to rigging, lashing, cables, or the like as part of a rigging system or securing mechanism. For example, in some embodiments, a securement member 110 may be formed in the first end portion 104 of the rigging connector 100. As shown, the securement member 110 may be sized and shaped such that a throat opening 112 is defined between at least a portion of the securement member 110 and the central bridge portion 108. In some embodiments, the securement member 110 may be operable to receive and releasably retain a tow strap, chain, rope, cable, wire, or other tow or lift mechanism.

In the embodiments of FIGS. 1-3, the securement member 110 is a hook 111 having a substantially cylindrical interior 113 operable to quickly receive and retain a tow strap or other rigging device received within the throat 112. As shown, the hook 111 includes a shank 115 connected to the central bridge portion 108. The shank 115 extends in an arc to form a saddle portion 119 at the first end portion 104 to define the cylindrical interior 113. The hook 111 continues to extend from the saddle portion 119 in the direction of the second end portion 106 to terminate at a distal tip 117 that defines the throat 112 between the tip 117 and the central bridge portion 108. As best seen in FIG. 3, the hook 111 curves from the second side 105 towards the first side 103 of the rigging connector 100 such that the throat 112 is defined in the first side 103 of the rigging connector 100. In some embodiments, the center of the cylindrical interior 113 of the hook 111 may be centered on a midline M of the rigging connector 100. In other embodiments the center of the cylindrical interior 113 of the hook 111 may be offset from a midline M of the rigging connector 100 to provide a desired functional characteristic (see FIG. 3). As shown in FIG. 3, the center axis of the interior 113 of the hook 111 is offset towards the first side 103 of the rigging connector 100 a first distance $D_1$ away from the midline M, though it is contemplated that the interior 113 of the hook 111 may be centered on the midline M or offset towards the second side 105 of the rigging connector 100 depending on particular applications. In the embodiments described above, the center axis of the interior 113 of the hook 11 may be centered on a shear pin 132 operable to attach the rigging connector 100 to a support line. In some embodiments, a side of the central bridge portion 108 defining the cylindrical interior 113 may be shaped as a flat ramped surface 109 such that the throat 112 is slanted and extends at an angle relative to the midline M of the rigging connector 100 (see FIG. 3). For example, the ramped surface 109 may extend upwardly away from the second end portion 106 and towards the first end portion 104. As illustrated in FIG. 3, the center axis of the interior 113 of the hook 111 may be positioned beyond the throat 112 and above the ramped surface 109.

With continued reference to FIGS. 1-3, first and second anchor legs 114, 116 may be formed in the first end portion 104 of the rigging connector 100 to releasably secure the rigging connector 100 to a recovery or support line associated with a recovery winch or overhead crane, for instance. In one embodiment, the first and second anchor legs 114, 116 may extend away from the central bridge portion 108 of the body 102 such that at least portions of the first and second anchor legs 114, 116 are in a substantially parallel relationship. In such embodiments, the first and second anchor legs 114, 116 may define a gap 118 therebetween for selectively receiving a portion of the support line. For example, each of the anchor legs 114, 116 may include opposing outer and inner surfaces 120, 130, the inner surfaces 130 of the anchor legs 114, 116 facing generally towards each other to define the gap 118 therebetween with the central bridge portion 108 of the body 102. In some embodiments, the inner surfaces 130 may extend in substantial parallel relationship. The gap 118 may have sufficient width to receive a portion of the support line (e.g., a loop end formed therein). In some embodiments, the gap 118 may be symmetrical about the midline M of the rigging connector 100 (see FIG. 3) such that the midline M bisects the gap between the first and second anchor legs 114, 116.

Figure 6:
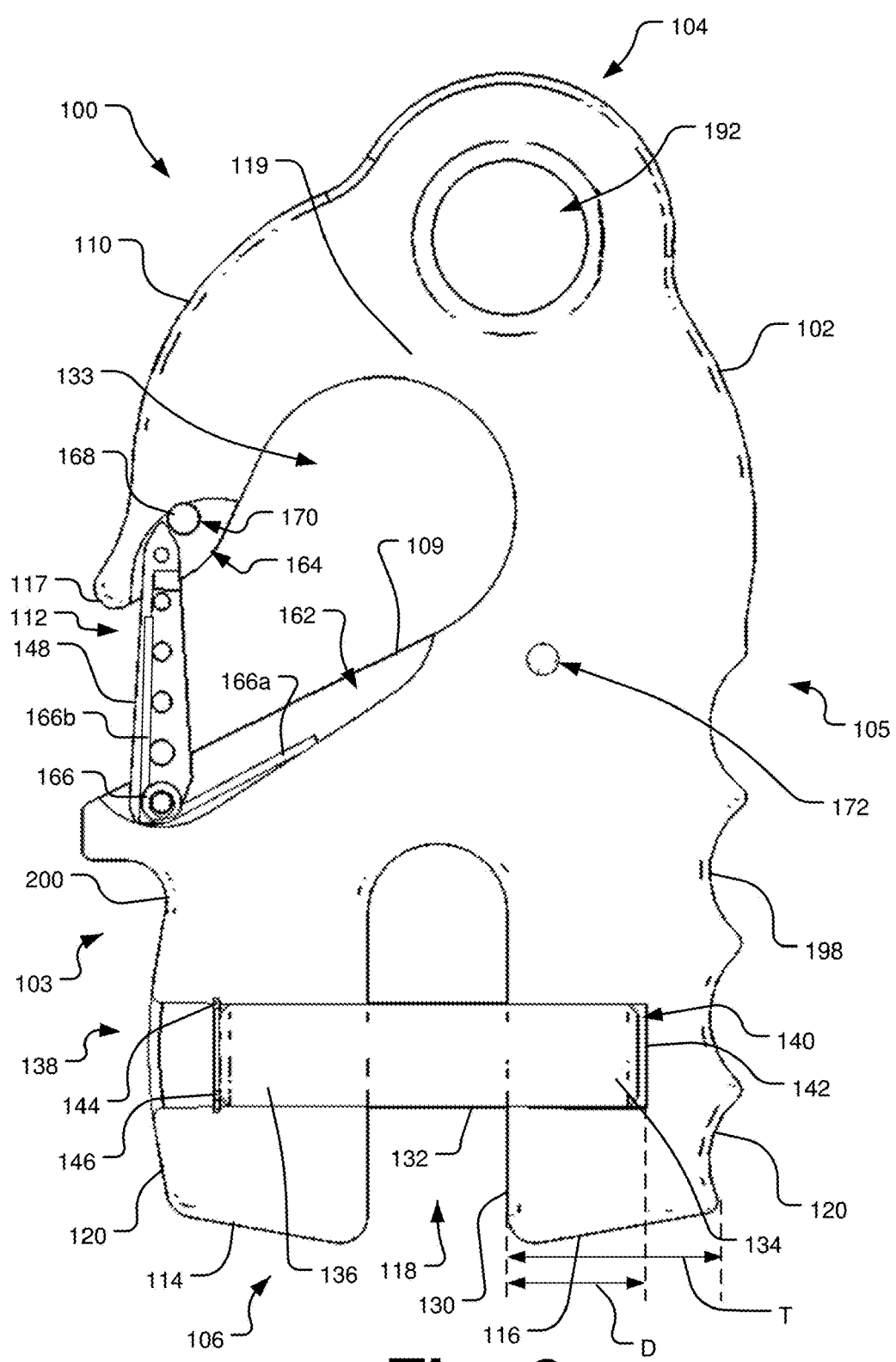
FIG. 6 is a cross-sectional view of the rigging connector of FIG. 1 taken along line 6-6 of FIG. 5 in accordance with an embodiment of the present disclosure.

With reference to FIG. 6, in some embodiments, the rigging connector 100 may include a shear pin 132 operable to retain the support line at least partially within the gap 118. As illustrated, the shear pin 132, which may include a first end 134 and a second end 136, may be coupled to both the first and second anchor legs 114, 116 and, in some embodiments, may span the gap 118 between the first anchor leg 114 and the second anchor leg 116 such that the shear pin 132 is in double shear engagement with the rigging connector 100.

As best seen in FIG. 6, the first anchor leg 114 may include a first mounting hole 138 defined therethrough. In such embodiments, the second anchor leg 116 may include a second mounting hole 140. In the embodiment of FIG. 6, the second mounting hole 140 is formed as a blind hole having a depth D less than a thickness T of the second anchor leg 116 defined between the inner surface 130 and the outer surface 120 of the second anchor leg 116. For example, as shown in FIG. 6, the second mounting hole 140 may be defined at least partially by a bottom wall 142 positioned between the outer and inner surfaces 120, 130 of the second anchor leg 116. Though shown as a blind hole, it is contemplated that the second mounting hole 140 may be a through hole defined through the second anchor leg 116. In such embodiments, the shear pin 132 may include a head portion and a retaining feature, for example, a groove to retain a circlip or a snap ring or a through bore sized to receive a cotter pin.

To connect the shear pin 132 to the rigging connector 100, the shear pin 132 is inserted within the first and second mounting holes 138, 140 such that a portion of the shear pin 132 (e.g., the first end 134) is inserted through the first mounting hole 138 and into the second mounting hole 140 until, for example, the first end 134 of the shear pin 132 contacts the bottom wall 142 defined in the second anchor leg 116 and the second end 136 of the shear pin 132 is positioned at least partially within the first mounting hole 138. In some embodiments, the shear pin 132 may be sized and shaped to fit snugly within the first and second mounting holes 138, 140.

With continued reference to FIG. 6, in some embodiments, the rigging connector 100 may include securement structure and/or components to selectively retain the shear pin 132 in place. For example, in one embodiment, the rigging connector 100 may include a groove 144 defined in the surface defining the first mounting hole 138. In some embodiments, the groove 144 may be sized to receive a circlip 146, snap ring, or the like to secure the shear pin 132 in place within the rigging connector 100. As shown, the circlip 146 may be positioned within the first mounting hole 138 and adjacent the second end 136 of the shear pin 132. When received within the groove 144, the circlip 146 retains the shear pin 132 in place by limiting lateral movement of the shear pin 132 away from the bottom wall 142 of the second anchor leg 116.

Referring now to FIGS. 1-3 and 6-8, in some embodiments, the rigging connector 100 may include one or more safety features to increase the safety of the rigging connector 100 and comply with regulatory mandates. For instance, in one embodiment, the rigging connector 100 may include a safety latch 148 pivotally connected to the body 102 to selectively secure the throat 112 of the securement member 110 (see FIGS. 1-3 and 6). In the embodiments shown and described, the safety latch 148 may be movable between open and closed positions to selectively open and close the throat 112 of the securement member 110. In the open position, the safety latch 148 may be positioned relative to the securement member 110 such that a tow strap or other rigging device may be inserted within or removed through the throat 112 of the securement member 110. In the closed position, the safety latch 148 may extend across the throat 112 to substantially limit insertion and/or removal of the rigging device.

As shown, the safety latch 148 may be an elongate member having a first end 150 and a second end 160 opposite the first end 150. The first end 150 is rotatably received within a first cavity 162 defined in the ramped surface 109 of the central bridge portion 108 of the elongate body 102. For instance, the first end 150 may pivot about a pin 152 connected to the central bridge portion 108 within the first cavity 162. In the open position, the second end 160 may be received at least partially or entirely within the first cavity 162 such that the safety latch 148 is at least flush with or recessed below the ramped surface 109. In such embodiments, the safety latch 148 may be received entirely within the first cavity 162 to provide full throat clearance for the throat opening 112. In the closed position, the second end 160 of the safety latch 148 may be rotated away from the first cavity 162 and received within a second cavity 164 defined in a portion of the securement member 110 (e.g., the tip 117 of a hook-shaped securement member 110). As shown in at least FIGS. 1 and 6, the rigging connector 100 may include a bias member 166 that biases the safety latch 148 to the closed position. For example, the bias member 166 may be a torsion spring having two spring arms 166A and 166B, one of the spring arms 166A received within the first cavity 162 and the other spring arm 166B connected to the safety latch 148 (see FIG. 6). Though the bias member 166 is shown to be a torsion spring, substantially any type of mechanism may be used to bias the safety latch 148 to the closed position.

With continued reference to FIGS. 1-3 and 6-8, the rigging connector 100 may include a locking pin 168 to secure the safety latch 148 in a desired position. In some embodiments, the locking pin 168 may selectively retain the safety latch 148 in the closed position to comply with, for example, OSHA standards in relation to hoisting persons via a crane. As shown, the locking pin 168 may be inserted within a bore 170 defined through the securement member 110 (e.g., within the tip 117 of a hook-shaped securement member 110). As best seen in FIG. 6, once inserted within the bore 170 the locking pin 168 may extend at least partially through the second cavity 164 and within the rotational path of the safety latch 148. In such embodiments, any attempt to rotate the safety latch 148 from the closed position to the open position causes the second end 160 of the safety latch 148 to contact the locking pin 168. In these embodiments, opening the safety latch 148 can only be accomplished by first removing the locking pin 168 from the bore 170. To safely store the locking pin 168 (e.g., when the locking pin 168 is not in use), in some embodiments, the rigging connector 100 may include a pin storage bore 172 defined in a portion of the body 102 (e.g., in the central bridge portion 108 adjacent the second anchor leg 116). In some embodiments, the bore 170 and the pin storage bore 172 may be sized identically.

Figure 8:
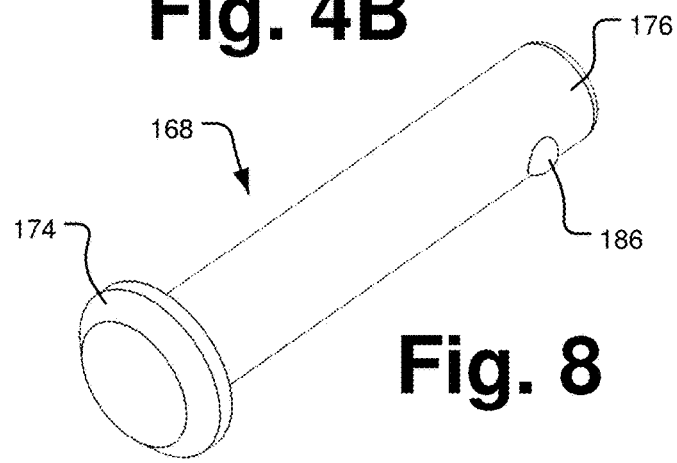
FIG. 8 is an isometric view of a locking pin in accordance with an embodiment of the present disclosure.
Figure 5:
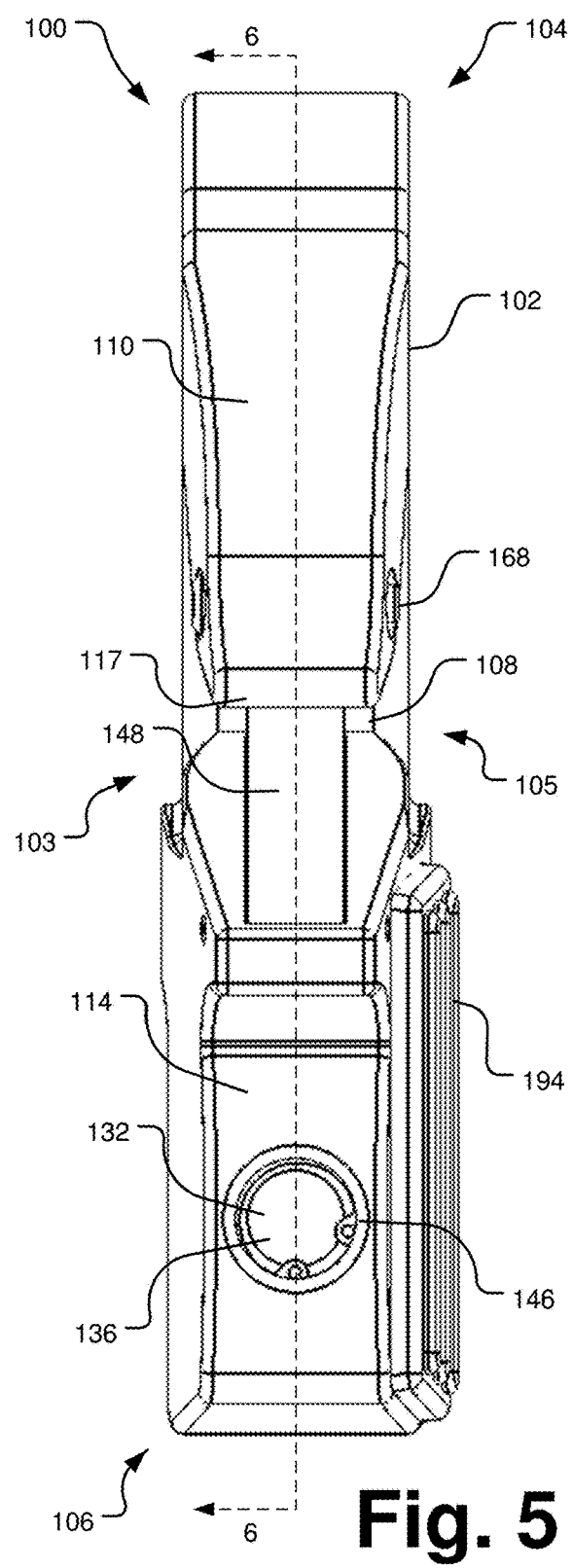
FIG. 5 is a right side elevation view of the rigging connector of FIG. 1 in accordance with an embodiment of the present disclosure.

With reference to FIG. 8, the locking pin 168 may be an elongate member having a head portion 174, a terminal end 176, and a shaft 178 extending from the head portion 174 to the terminal end 176. In such embodiments, the terminal end 176 is inserted within the bore 170 or pin storage bore 172 until, for example, the head portion 174 contacts a surface portion of the rigging connector 100. In an exemplary embodiment, the head portion 174 may be received within a recess 180 defined in a top surface 182 and/or a bottom surface 184 (e.g., concentric with the bore 170 and/or the pin storage bore 172) of the rigging connector 100 such that the head portion 174 does not extend above the top surface 182 or below the bottom surface 184 (see FIG. 7). In some embodiments, the locking pin 168 may include a retention feature operable to limit removal of the locking pin 168 from the bore 170 and the pin storage bore 172. For example, the locking pin 168 may include a dome-shaped protrusion 186 extending away from the shaft 178 adjacent the terminal end 176. As best seen in FIG. 7, each of the bore 170 and the pin storage bore 172 may include an annular shelf or recess 190 to create a detent fitting configured for corresponding engagement with the protrusion 186 of the locking pin 168. As shown in FIG. 7, the corresponding engagement between the annular recess 190 and the protrusion 186 limits removal of the locking pin 168 from either the bore 170 or the pin storage bore 172, at least under undesirable circumstances. The protrusion 186 may be spring-biased or otherwise deformable to clear the annular recess 190 when removal of the locking pin 168 is desired. Additionally or alternatively, the protrusion 186 and/or the locking pin 168 may be friction fit with the bore 170 and the pin storage bore 172.

Referring now to FIGS. 1-3 and 6, in some embodiments, the rigging connector 100 may include a shackle mounting hole 192 operable to secure the rigging connector 100 to a rigging device (e.g., a shackle). In some embodiments, the shackle mounting hole 192 may be defined in a portion of the body 102 (e.g., in a portion of the securement member 110 such as the tip 117 or the saddle portion 119). For example, the rigging connector 100 may be formed such that the shackle mounting hole 192 may be positioned at any point along the body 102 of the rigging connector 100. In some embodiments, the shackle mounting hole 192 may be positioned in-line with the midline M of the rigging connector 100. In other embodiments, the shackle mounting hole 192 may be offset from the midline M of the rigging connector 100 to allow use of both the shackle mounting hole 192 and the hook 111. For example, the shackle mounting hole 192 may be offset towards the second side 105 of the rigging connector 100 (see FIG. 3). In some embodiments, the center axis of the shackle mounting hole 192 may be offset towards the second side 105 a second distance $D_2$ away from the midline M and away from the throat opening 112. The first distance $D_1$ and the second distance $D_2$ may be substantially equal, or, in some embodiments, the first distance $D_1$ may be greater than or less than the second distance $D_2$. In the various embodiments described above, the offset nature of the shackle mounting hole 192 in conjunction with the offset nature of the interior 113 of the hook 111 relative to each other and/or the midline M allows greater clearance for the tip 117 of the hook 111 to clear an opening on an opposing clevis or other attachment point. In some embodiments, the offset characteristics of the shackle mounting hole 192 and the interior 113 of the hook 111 may reduce the overall length of the rigging connector 100 as well as reduce the material thickness of the portion of the body 102 defining the shackle mounting hole 192 compared to rigging members having the shackle mounting hole 192 centered on the hook 111, for instance.

Figure 4A:
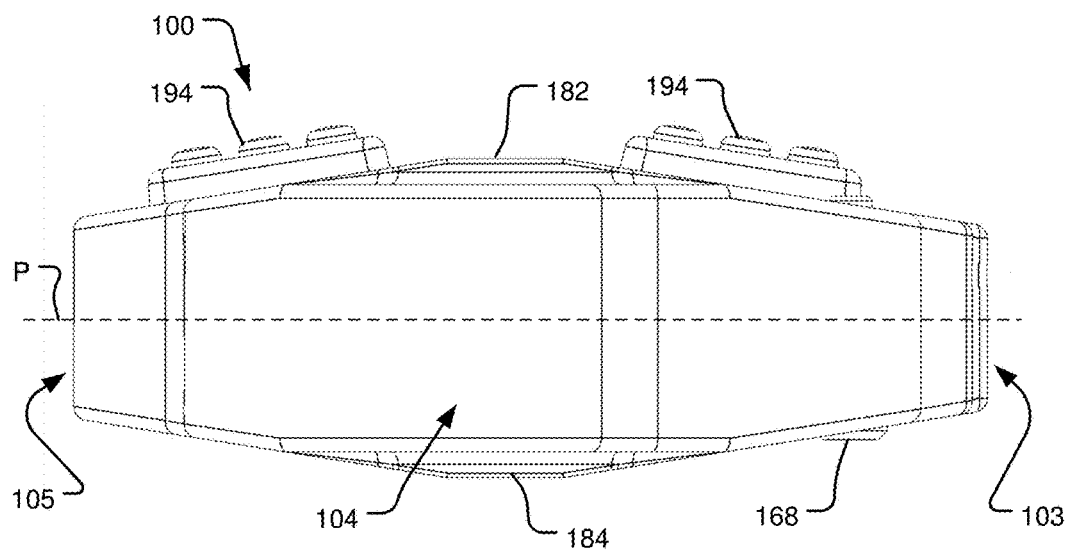
FIG. 4A is a front elevation view of the rigging connector of FIG. 1 in accordance with an embodiment of the present disclosure.
Figure 4B:
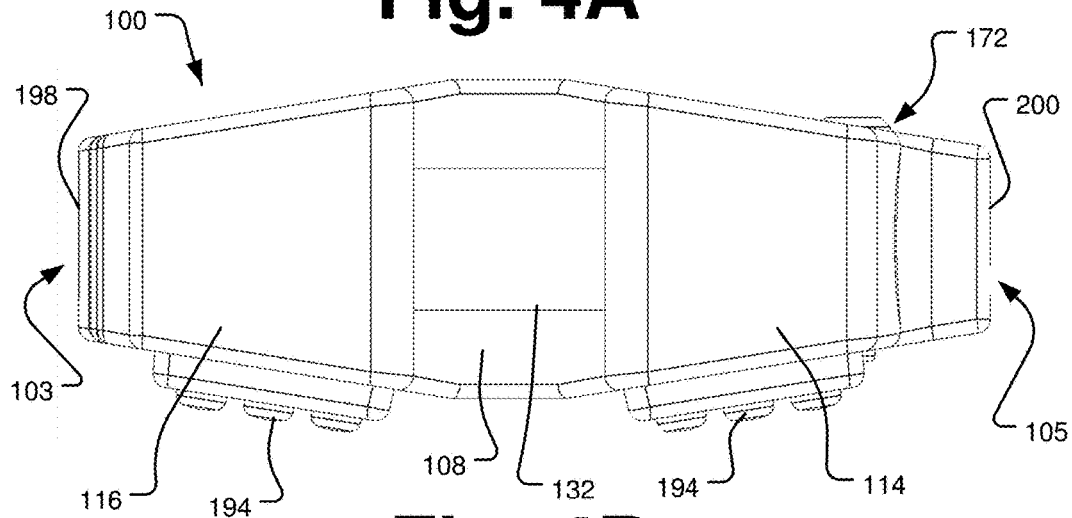
FIG. 4B is a rear elevation view of the rigging connector of FIG. 1 in accordance with an embodiment of the present disclosure.

In some embodiments, the shackle mounting hole 192 may be disposed at various angles with respect to the body 102 of the rigging connector 100. For instance, the center axis of the shackle mounting hole 192 may be substantially orthogonal to a plane P bisecting the body 102 between the top and bottom surfaces 182, 184 of the rigging connector 100 (see FIG. 4). Additionally, the center axis of the shackle mounting hole 192 may extend substantially perpendicular to the first and second mounting holes 138, 140 such that the shear pin 132 extends transverse to the shackle mounting hole 192. The interior 113 of the hook 111 may be similarly configured. In such embodiments, the shear pin 132 may extend substantially parallel to the plane P. Though shown has having a circular cross-section, the shackle mounting hole 192 may take on any shape needed for a particular application. For example without limitation, the shackle mounting hole 192 may be circular, oval, square, rectangular, or hexagonal in cross-section depending on a particular aesthetic or functional characteristic.

In accordance with embodiments discussed herein, the shackle mounting hole 192 may be a structurally load-bearing feature. More specifically, the shackle mounting hole 192 may not merely be a feature to assist in handling the rigging connector 100 or for other non-structural functions. Thus, in accordance with embodiments, the shackle mounting hole 192 may be a fortified hole that supports forces imparted to the rigging connector 100 at the location of the shackle mounting hole 192 along the saddle portion 119. In some embodiments, the shackle mounting hole 192 may be provided with sufficient strength and durability to support specific load amounts. For example, the saddle portion 119 may include sufficient material such that the hook 111 and the shackle mounting hole 192 are able to support the same or substantially equal load amounts. Due to at least the relative offsets of the hook 111 and the shackle mounting hole 192 from the midline M of the rigging connector 100, the strength of the hook 111 at the saddle portion 119 is not compromised by the shackle mounting hole 192. In some embodiments, supplemental fortification mechanisms such as steel rings or the like may be added to give the shackle mounting hole 192 additional strength as desired. The shackle mounting hole 192 may be positioned along the body 102 such that the throat 112 between the securement member 110 and the central bridge portion 108 is not affected (e.g., enlarged) under specific load amounts.

In alternative embodiments, a rigging connector may be provided having a hook with a shackle mounting hole with alternative base structures opposite the shackle mounting hole. For example, the rigging connector could have a base formed as a shank, a fixed eye, a swivel eye, a standard shackle, a turnbuckle, or other form of base connector. As in the embodiment shown in the figures, the shackle mounting hole may be a fortified hole that supports forces imparted to the rigging connector at the location of the shackle mounting hole along the saddle portion. In some embodiments, the shackle mounting hole may be provided with sufficient strength and durability to support specific load amounts. For example, the saddle portion may include sufficient material such that the hook and the shackle mounting hole are able to support the same or substantially equal load amounts.

With reference to FIG. 1, the rigging connector 100 may include other features for convenience and/or function. For example, as shown in FIG. 1, the rigging connector 100 may include one or more, such as a plurality of, fairlead engagement pads 194 connected to the first and second anchor legs 114, 116 to limit premature support line failure caused by scratched fairlead surfaces. In such embodiments, the fairlead engagement pads 194 provide improved cushioning and storage onto all fairlead surfaces without scratching the fairlead surfaces. As shown, the fairlead engagement pads 194 may be connected to at least one of the top surface 182 and the bottom surface 184 (e.g., the top surface 182). Padding may also be provided on the surfaces of the first and second anchor legs 114,116 at the second end 106. The fairlead engagement pads 194 may be formed from substantially any type of material designed to limit damage to the fairlead surfaces, including without limitation rubber, polymer, and plastics. Additionally, surfaces of the rigging connector 100 could be coated or overmolded with a resilient layer (e.g., rubber, urethane, plastics) to provide a protective surface for abutting against a fairlead.

With continued reference to FIG. 1, each of the first and second anchor legs 114, 116 may include a grip feature 196 to provide ease of grasping the rigging connector 100 by a user or to position the rigging connector 100 in proper orientation. For example, in the case of securement member 110 failure, the rigging connector 100 may be driven into the ground instead of up in the air. For example, the grip feature 196 of the second anchor leg 116 may include a plurality of finger holds 198 disposed on the outer surface 120 of the second anchor leg 116. In like manner, the grip feature 196 of the first anchor leg 114 may include a back strap disposed on the outer surface 120 of the first anchor leg 116. As shown, the back strap 200 may be convexly-shaped and curved to generally match the shape of the palm of a user's hand. To further position the rigging connector 100 within the hand of a user, the grip feature 196 of the first anchor leg 114 may also include a protrusion 202 sized to correspondingly engage the web of skin between the thumb and index finger of a user's hand. The provision of such grip features 196 minimizes the opportunity for the rigging connector 100 to slip from the hand of a user by allowing a user to more firmly grasp the rigging connector 100, especially in wet, muddy, or other slick conditions.

Finger holds 198 may be provided on either of the anchor legs 114, 116 and the back strap 200 provided on the opposite of the anchor legs 114, 116 as desired. As shown in at least FIG. 1, in one embodiment the finger holds 198 may be positioned opposite the throat 112 of the securement member 110 to influence a user to position the throat 112 generally upwards when hooking the rigging connector 100 to a substantially horizontal portion of a web or cable from a recovery winch, for instance. Positioning the rigging connector 100 with the throat 112 upwards biases the rigging connector 100 downwardly away from bystanders. Should the hook 111 fail, the bias force will drive the rigging member 100 toward the ground rather than upward, potentially into the users face or head.

The rigging connector 100 may be formed from a variety of materials and means. For example, the rigging connector 100 may be formed from aluminum, steel, titanium, or any other metal, alloy, composite, or other suitable material with sufficient strength for use in rigging and/or lifting environments. In some embodiments, the rigging material may include anti-corrosion or corrosion inhibiting coatings or material.

The foregoing description has broad application. Accordingly, the discussion of any embodiment is meant only to be explanatory and is not intended to suggest that the scope of the disclosure, including the claims, is limited to these examples. In other words, while illustrative embodiments of the disclosure have been described in detail herein, the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

All directional references (e.g., distal, upper, lower, upward, left, right, lateral, front, back, top, bottom, outer, inner, below) are only used for identification purposes to aid the reader's understanding of the present disclosure and drawings and not as limitations. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., first, second, etc.) are not intended to connote importance or priority, but are used to distinguish one feature from another. The drawings are for purposes of illustration only and the dimensions, positions, order and relative sizes reflected in the drawings attached hereto may vary.

What is claimed is:

1. A rigging connector comprising
   an elongate body having a central bridge portion and opposing first and second end portions extending from the central bridge portion;
   a securement member formed in the first end portion of the body and defining a throat opening with the central bridge portion;
   first and second anchor legs formed in the second end portion of the body, the first and second anchor legs defining a gap therebetween for receiving a portion of a support line;
   a shear pin operable to retain the support line at least partially within the gap; and
   a shackle mounting hole defined in the first end portion and having a center axis extending transverse to the shear pin, wherein
   the shackle mounting hole is configured to support a same load amount as the securement member.

2. The rigging connector of claim 1, wherein the shackle mounting hole is defined in a portion of the securement member.

3. The rigging connector of claim 1 further comprising a safety latch movable between open and closed positions to selectively open and close the throat opening of the securement member.

4. The rigging connector of claim 3 further comprising a bias member biasing the safety latch to the closed position.

5. The rigging connector of claim 3 further comprising a locking pin that selectively retains the safety latch in the closed position.

6. The rigging connector of claim 5 further comprising a pin storage bore defined in a portion of the body to releasably store the locking pin when not in use.

7. The rigging connector of claim 3, wherein
   the safety latch includes a first end and a second end;
   the first end of the safety latch is rotatably received within a first cavity defined in the elongate body;
   in the open position, the second end of the safety latch is received at least partially within the first cavity such that the safety latch is received substantially within the first cavity; and
   in the closed position, the second end of the safety latch is received within a second cavity defined in a portion of the securement member.

8. The rigging connector of claim 1 further comprising a plurality of fairlead engagement pads connected to the first and second anchor legs.

9. The rigging connector of claim 1, wherein the shackle mounting hole is centered on a bisector of the gap between the first and second anchor legs.

10. The rigging connector of claim 1, wherein the shackle mounting hole is offset from a midline of the rigging connector extending from the first end portion to the second end portion.

11. The rigging connector of claim 10, wherein the shackle mounting hole is offset away from the throat opening.

12. The rigging connector of claim 1, wherein
the first anchor leg includes a first mounting hole defined therethrough;
the second anchor leg includes a second mounting hole formed as a blind hole;
the shear pin includes opposing first and second ends;
the first end of the shear pin resides within the first mounting hole;
the second end of the shear pin resides within the second mounting hole; and
the shear pin spans the gap between the first anchor leg and the second anchor leg.

13. The rigging connector of claim 12 further comprising a groove defined in a surface defining the first mounting hole, the groove sized to receive a circlip to secure the shear pin in place.

14. The rigging connector of any of claim 1 further comprising grip features disposed on each of the first and second anchor legs.

15. The rigging connector of claim 14, wherein the grip feature of the second anchor leg includes a plurality of finger holds.

16. The rigging connector of claim 15, wherein the second anchor leg is on a side of the rigging connector opposite the throat opening.

17. A rigging connector comprising
a body having opposing top and bottom surfaces, opposing first and second sides, and opposing first and second end portions;
a hook defined in the first end portion, the hook having a substantially cylindrical interior defined by a shank curving from the second side towards the first side, the shank terminating in a tip that defines a slanted throat opening in the first side of the body;
first and second anchor legs formed in the second end portion and defining a gap therebetween;
a shear pin having a first end and a second end opposite the first end, the first and second ends received respectively within the second anchor leg and the first anchor leg such that the shear pin spans the gap between the first and second anchor legs; and
a shackle mounting hole defined in the hook, wherein
a center axis of the interior of the hook and a center axis of the shackle mounting hole are each orthogonal to a plane bisecting the body between the top and bottom surfaces;
the shackle mounting hole is configured to support a same load amount as the hook; and
the shear pin extends substantially parallel to the plane and between the first side and the second side.

18. The rigging connector of claim 17, wherein the center axis of the interior of the hook is centered on a bisector of the gap between the first and second anchor legs.

19. A rigging connector comprising
a body having opposing first and second end portions extending from a central bridge portion;
a hook defined in the first end portion, the hook having a shank extending from the central bridge portion in an arc to form a saddle portion to define an interior of the hook, the hook extending from the saddle portion in a direction of the second end portion to terminate at a distal tip that defines a throat opening between the distal tip and the central bridge portion;
an attachment structure defined within the second end portion configured to receive and secure an end of a winch rope to the second end portion;
a flat surface defined on a side of the second end portion adjacent to the attachment structure; and
fairlead engagement pad connected to the flat surface on the side of the second end portion; wherein
when the winch rope is retracted by a winch such that the rigging connector is pulled against a surface of a fairlead on the winch, a length of the winch rope extending from the end of the winch rope is configured to extend in an orientation perpendicular to the side of the second end portion and the fairlead engagement pad is configured to interface with the surface of the fairlead on the winch.

20. The rigging connector of claim 19 further comprising a shackle mounting hole defined in the saddle portion, open and configured to receive a shackle pin therethrough, and offset from a center axis of the interior of the hook extending from the first end portion to the second end portion such that the offset is situated away from the throat opening.

21. The rigging connector of claim 19 wherein
the second end portion includes first and second anchor legs extending away from the central bridge portion;
the attachment structure is positioned between the anchor legs;
the anchor legs define opposing sides;
the flat surface is defined on the first anchor leg on a first of the opposing sides;
a second flat surface is defined on the second anchor leg on the first of the opposing sides; and
a second fairlead engagement pad is provided on the second flat surface.

22. A rigging connector comprising
a hook forming a first end portion; and
a second end portion including a connection structure for attachment of a winch rope, wherein
the hook includes
a shank portion extending from the second end portion;
a saddle portion extending from the shank and curving from a first side toward a second side;
a tip portion extending from the saddle portion toward the second end portion along the second side, wherein
the shank portion, the saddle portion, and the tip portion together define an interior of the hook;
the tip portion is spaced apart from the second end portion to define a throat opening to the interior of the hook; and
a shackle mounting hole defined in the shank portion open and configured to receive a shackle pin therethrough and further configured with sufficient wall thickness such that the shackle mounting hole will bear a load congruent to a load attached to the hook within the interior of the hook.

* * * * *